May 12, 1925.
A. McKENZIE
1,537,846
VISCERA INSPECTION TABLE
Filed July 10, 1919
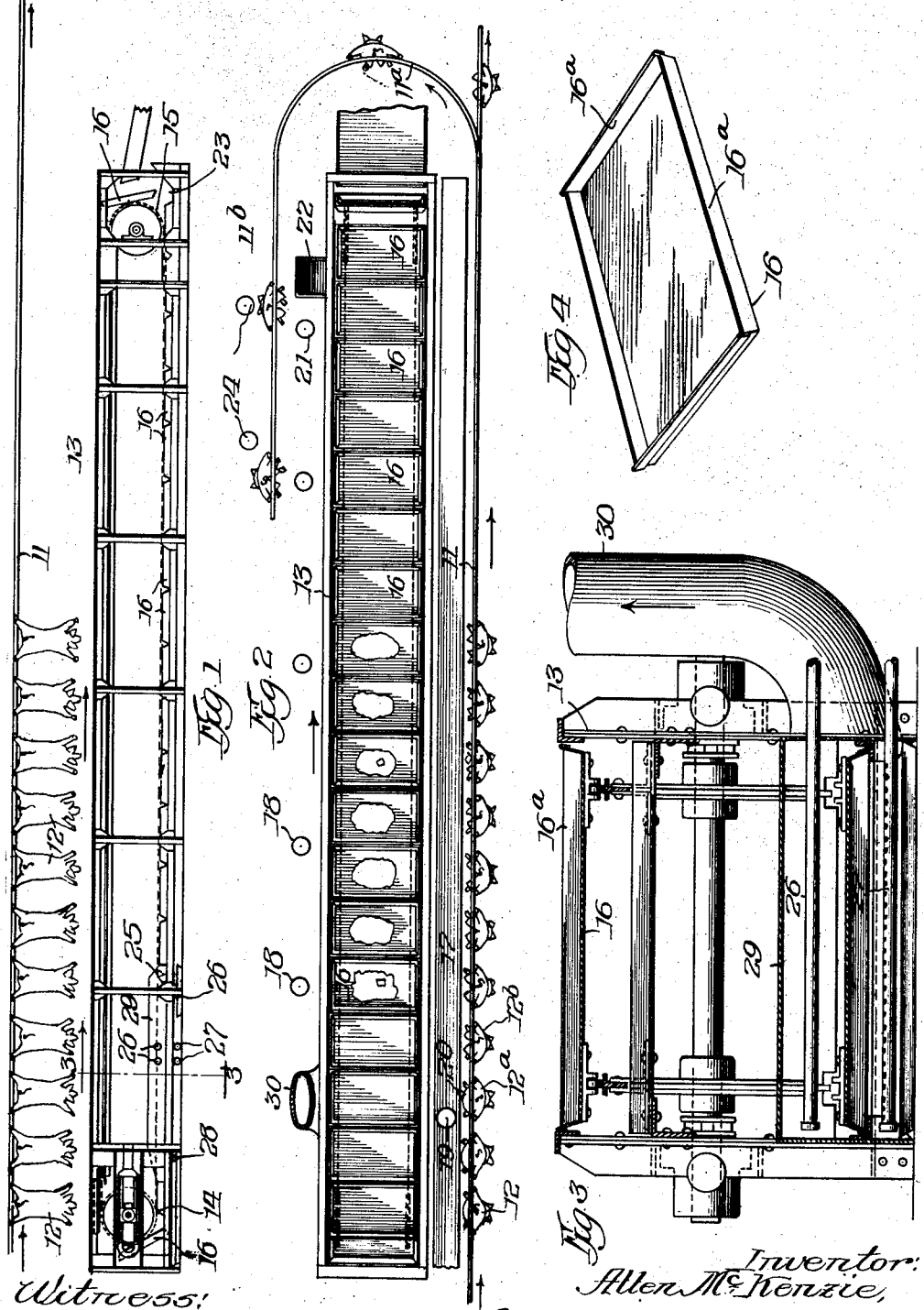
Inventor:
Allen McKenzie,
By Cromwell, Greist & Warden
Attys.

Patented May 12, 1925.

1,537,846

UNITED STATES PATENT OFFICE.

ALLEN McKENZIE, OF CHICAGO, ILLINOIS.

VISCERA-INSPECTION TABLE.

Application filed July 10, 1919. Serial No. 309,821.

*To all whom it may concern:*

Be it known that I, ALLEN McKENZIE, a citizen of the United States, residing at Chicago, in the county of Cook and State of Illinois, have invented certain new and useful Improvements in Viscera-Inspection Tables, of which the following is a specification.

In the butchering of animals on a large scale for the market as practised by the large packers, a most important feature is the inspection by company and government inspectors to determine whether the animal is in any way diseased or otherwise unfit for food.

This inspection includes not only a careful examination by specialists of the body, the various organs, glands, etc., but as well of the viscera where conditions of ill-health are quite likely to become manifest.

In practice, it is customary in the larger packing houses to pass the carcasses of hogs, for example, suspended by an overhanging conveyor at the rate of from five hundred to fifteen hundred per hour in turn before a series of workmen stationed at intervals, each of whom performs a distinctive operation thereon. After the killing, scalding, de-hairing, partially severing the head, and splitting the abdomen, the carcass is disemboweled and ultimately subdivided and passed to the various sub-departments in preparation for marketing, assuming the same to have satisfactorily passed the several extremely rigid inspections as to edibility.

The first inspection is usually made of the head glands and thereafter, following disembowelment, of the viscera and of the internal organs, these parts being first inspected by certain specialists and then checked by others. If the animal is found to have been in perfect health, it is passed on to the later operations preparatory to marketing; if any suspicious condition is manifest, the carcass is so tagged and is shifted aside out of line for a further most critical examination, after which it is either passed or condemned.

Healthy viscera includes much of an edible nature, but if diseased in any degree must be condemned as unfit for food purposes and, as with the carcass, only utilized in the making of such by-products as are not affected by the diseased condition, the making of glue, soap, fertilizer, etc.

The very great importance will be readily appreciated, therefore, of segregating the viscera of the several animals and maintaining the same distinct until after a final determination of its status and, in case a given viscera unit be found to be diseased, isolating the same to safe-guard healthy viscera from contamination by contact therewith.

Various expedients have been heretofore suggested to effect and maintain segregation during inspection, these expedients being rendered more or less inefficient by a natural desire to interfere as little as possible with expedition in handling the animals subject to inspection.

The present invention has to do with a solution of this problem and has for its object the efficient correlation of the inspection with the continuous butchering process and the maintenance of absolute isolation of the viscera from the several carcasses pending a final determination as to the edible or inedible character of the animal.

In order that the invention may be readily understood, a preferred embodiment of the same is set forth in the accompanying drawings and in the following detailed description based thereon. It will be apparent the invention is susceptible of being embodied in structural forms varying in detail from that chosen by way of exemplification, wherefore the drawing and description are to be taken in an illustrative rather than in an unnecessarily limiting sense. In the drawing—

Fig. 1 is a rear elevation, somewhat diagrammatic in character, showing the relation between the carcass conveyor and the viscera conveyor;

Fig. 2 is a top plan view of the same;

Fig. 3 is a transverse section through the viscera conveyor on an enlarged scale taken substantially on the line 3—3 of Fig. 1; and Fig. 4 is a detail perspective view of one of the trays.

Describing the invention by reference in detail to the illustrative drawings, the carcass conveyor is indicated by the reference numeral 11, the same consisting, usually of a moving chain provided at regular intervals with hooks or the like for suspending the carcasses by the gambrel. The carcasses themselves, having been passed before and been operated upon by certain operatives are shown traversing that portion of their path where the inspection is made, and are designated by the reference numerals 12, 12ª and 12ᵇ. The viscera inspection table is designated generally by the reference numeral 13 and comprises a pair of drums 14 and 15 around which moves an endless chain of trays 16 linked together. These trays individually have a length coextensive with the width of the table and are marginally flanged as shown at 16ª to prevent the escape of liquids therefrom. The longer sides of the trays lie closely adjacent the sides of the preceding and following trays but preferably out of actual contact therewith. The width of the trays, viewed longitudinally of the moving table, corresponds to the distance separating the suspending devices on the carcass conveyor 11 and the speed of the travel of the viscera conveyor or inspection table corresponds to that of the carcass conveyor whereby the viscera of a given animal disposed within the tray maintains a position directly in front of the animal until after the inspection is completed.

Workmen are stationed on the standing platform 17 between the inspection table 13 and the carcass conveyor 11 while inspectors are stationed on the opposite side of the inspection table, their positions being indicated by stools 18. Obviously the number of workmen and inspectors will depend upon the number of animals that are being handled on a given day, the speed of travel of the carcass conveyor and of the inspection conveyor or table being greater or less according to the kill. An inspector of the head glands may also be located at the position marked 19.

The carcass 12, as it reaches the inspection table, has the head severed except as to the back of the neck so as to expose the head glands to view. The inspector, positioned at 19, examines these glands and if any suspicious conditions are found a tag 20 is affixed as indicated at the position 12ª. Passing this position the carcass is split along the belly at the position 12ᵇ and the next workman removes the viscera and drops it into the tray 16 on the inspection table immediately behind him. If the particular carcass bore a tag placed by the inspector 19 as indicating his suspicions derived from an examination of the head glands, this tag is removed by the workman and dropped upon the viscera in the tray at 16 in order to indicate to the inspector at 18 the suspicious character of the viscera. As the viscera travel to the right on the inspection table the different portions thereof are inspected carefully by the men located at 18 and the carcasses traveling alongside the viscera upon the conveyor 11 are identified by tags or not according as judgment is passed upon the viscera. If the inspection shows the viscera to be diseased and the carcass unfit for food, both carcass and viscera are stamped indelibly to indicate condemnation. When the viscera leaves the discharge end of the conveyor at the right in the drawings, if they have been found to be healthy and in every respect unobjectionable for food purposes, they are withdrawn by a man stationed at 21 and dropped into the shute 22; if diseased and unfit for food they are discharged by gravity to the condemned chute 23 as the tray 16 has its position reversed in passing over the drum 15. The carcasses pass along the conveyor 11 and the condemned are separated from the edible carcasses. If there yet remains doubt in the mind of the inspectors as to whether the carcass, as disclosed by an inspection of the viscera, is fit for food it is shunted from the conveyor 11 to the switch 11ª and thence to the track 11ᵇ where it is given a final conclusive inspection by inspectors located at 24.

When the trays 16 are inverted and start upon their return trip to the initial end of the conveyor at the left, they are drained by gravity until they reach the point indicated at 25 where they are subjected to an upwardly directed stream of cold water from the pipe 26 to cleanse the remaining matter therefrom, followed by a subjection from above and below to the action of steam jets supplied by the pipes 26 and 27, and again to a cold jet at 28 just before the tray moves upwardly to its position of re-use as indicated at the left hand end of Figure 1. A housing 29 encloses the several cleansing jets and is provided with a ventilation flue 30.

The importance will be readily appreciated of having the viscera in the respective trays absolutely isolated one from the other. If for instance the viscera in one tray is diseased the liquids therefrom would come in contact with and contaminate the viscera of the next adjacent animal unless traveling of the liquids from one to the other were precluded. If the conveyor were an endless belt of rubber or overlapping plates there would be such an interchange of fluids as to render the edible viscera inedible by contamination. The employment of trays flanged or otherwise having their interiors effectually isolated one from the other prevents such contamination. The coordination of movement between the carcass conveyor and the viscera conveyor or inspection table insures the preservation of the identity between the carcass and the viscera until the inspection is completed and thus safeguards against any confusion. The thorough cleansing and sterilization of the trays before re-use while in their inverted position guards against the carrying over to a fresh viscera unit of any contamination from a tray previously used for diseased viscera.

I claim:

1. A viscera inspection table including a series of isolated imperforate unitary retaining trays, said trays serially linked together to form an endless platform conveyor, means to support and drive the conveyor, and means to sterilize the trays prior to reuse.

2. A viscera inspection table including a series of imperforate unitary walled retaining trays, said trays serially linked close together to form an endless platform conveyor, means to support and drive the conveyor, and means to sterilize the trays prior to reuse.

3. A viscera inspection table including a series of imperforate unitary retaining trays isolated by marginal upstanding flanges, said trays serially linked together to form an endless platform conveyor, means to support and drive the conveyor, and means to sterilize the trays prior to reuse.

4. A viscera inspection table including a series of isolated imperforate unitary trays, said trays serially linked together to form an endless platform conveyor, means to support and drive the conveyor, a receptacle for condemned viscera into which the trays successively discharge a receptacle for edible viscera at one side of the conveyor near the discharge end thereof, means to sterilize the trays during the return flight of the conveyor.

5. A viscera inspection table including a series of isolated imperforate unitary concave retaining trays, said trays serially linked together to form an endless platform conveyor, means to support and drive the conveyor, a receptacle for one class of viscera into which the conveyor discharges by gravity, a second receptacle alongside the conveyor for the reception of another class of viscera, means to sterilize the trays during the return flight of the conveyor.

6. A viscera inspection table including a series of retaining imperforate unitary trays isolated by marginal upstanding flanges, said trays serially linked together to form an endless platform conveyor, means to support and drive the conveyor, a receptacle for condemned viscera into which the conveyor discharges by gravity, a second receptacle along side the conveyor for the reception of approved viscera, means to sterilize the trays during the return flight of the conveyor.

7. A viscera inspection table including a series of isolated trays, said imperforate unitary retaining trays serially linked together to form an endless platform conveyor, means to support and drive the conveyor, means for cleansing and sterilizing the trays during the return flight while in inverted position and prior to re-use comprising jets of steam and cold water directed upon the trays and disposed adjacent the terminus of the return.

8. A viscera inspection table including a series of imperforate unitary retaining trays isolated by marginal upstanding flanges, said trays serially linked together to form an endless platform conveyor, means to support and drive the conveyor, means for cleansing and sterilizing the trays during the return flight while in inverted position and prior to re-use, comprising jets arranged to direct cold water, steam and cold water thereupon successively in the order named.

9. A conveyor for viscera comprising isolated retaining pans of imperforate unitary structure; means for moving said pans along an upper path in one direction with their open faces up, and along a lower path in the opposite direction with their open faces down; and means located below the lowest position of the pans for injecting cleansing and sterilizing agents into them.

10. A viscera inspection table comprising a series of isolated retaining pans; said pans being of imperforate unitary structure and serially connected together to form an endless conveyor; means to support and drive the conveyor; and means to sterilize said pans prior to reuse.

In testimony whereof I have hereunto signed my name in the presence of two subscribing witnesses.

ALLEN McKENZIE.

Witnesses:
 ABRAM B. STRATTON,
 RALPH SHAUMAN.